US010132983B2

(12) United States Patent
Marinus et al.

(10) Patent No.: US 10,132,983 B2
(45) Date of Patent: Nov. 20, 2018

(54) LAMP WITH FLOATING LIGHT SOURCE

(71) Applicant: PHILIPS LIGHTING HOLDING B.V., Eindhoven (NL)

(72) Inventors: Antonius Adrianus Maria Marinus, Eindhoven (NL); Erik Paul Boonekamp, Eindhoven (NL); Hendrik Jan Eggink, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/817,326

(22) Filed: Nov. 20, 2017

(65) Prior Publication Data

US 2018/0143370 A1    May 24, 2018

(30) Foreign Application Priority Data

Nov. 22, 2016    (EP) .................................... 16200056

(51) Int. Cl.
  *F21V 8/00*    (2006.01)
  *F21K 9/235*    (2016.01)
  *F21Y 115/10*    (2016.01)

(52) U.S. Cl.
  CPC ............ *G02B 6/0038* (2013.01); *F21K 9/235* (2016.08); *G02B 6/009* (2013.01); *G02B 6/0068* (2013.01); *G02B 6/0083* (2013.01); *G02B 6/0088* (2013.01); *F21Y 2115/10* (2016.08); *G02B 6/0085* (2013.01)

(58) Field of Classification Search
  None
  See application file for complete search history.

(56) References Cited

U.S. PATENT DOCUMENTS

| 8,953,926 B1 | 2/2015 | Kelly et al. |
| 2002/0080614 A1 | 6/2002 | Terada |
| 2010/0302770 A1 | 12/2010 | Lee et al. |
| 2012/0081880 A1 | 4/2012 | Narendran et al. |
| 2012/0169235 A1 | 7/2012 | Dassanayake et al. |
| 2015/0085492 A1 | 3/2015 | Kato et al. |

FOREIGN PATENT DOCUMENTS

| CN | 202546362 U | 11/2013 |
| JP | 2009026708 A | 2/2009 |
| JP | 2012009417 A | 1/2012 |
| JP | 2012104238 A | 5/2012 |
| WO | WO2014180689 A1 | 11/2014 |

*Primary Examiner* — Kristy A Haupt
(74) *Attorney, Agent, or Firm* — Akarsh P. Belagodu

(57) ABSTRACT

A lamp comprising: a solid-state lighting element; a light guide having two oppositely arranged outer surfaces and a circumferential edge joining the respective circumferences of the two outer surfaces, the light guide being arranged to couple in light emitted by the solid-state lighting element at the circumferential edge; and two slits arranged in the light guide and adapted to couple light out from the light guide, wherein each of the two slits extends from one of the outer surfaces to the other one of the outer surfaces, the two slits at least partly crossing each other inside the light guide.

15 Claims, 2 Drawing Sheets

LAMP WITH FLOATING LIGHT SOURCE

FIELD OF THE INVENTION

The present invention relates to a lamp based on solid-state lighting (SSL) technology.

BACKGROUND OF THE INVENTION

There is currently a strong trend to replace incandescent lamps with lamps based on SSL technology for reasons that include increased energy efficiency, longer operational lifetime and more visual design options. An example of a lamp of the latter type is the light-emitting diode (LED) lamp disclosed in CN202546362U.

It is desirable that SSL lamps be inexpensive to produce and meet high technical performance standards, e.g. with regards to thermal properties. Since visual aesthetics influence consumers' buying decisions, it is also desirable that SSL lamps be aesthetically pleasing. Meeting all of these requirements is associated with many technical challenges, and there is a need for further efforts aimed at addressing those challenges.

SUMMARY OF THE INVENTION

It would be advantageous to provide an improved or alternative lamp based on SSL technology. In particular, it would be advantageous to provide such a lamp that represents an attractive trade-off between aesthetics, thermal properties and manufacturing costs.

To better address these concerns, according to a first aspect of the invention, there is provided a lamp comprising: an SSL element; a light guide having two oppositely arranged outer surfaces and a circumferential edge joining the respective circumferences of the two outer surfaces, the light guide being arranged to couple in light emitted by the SSL element at the circumferential edge; and two slits arranged in the light guide and adapted to couple light out from the light guide, wherein each of the two slits extends from one of the outer surfaces to the other one of the outer surfaces, the two slits at least partly crossing each other inside the light guide.

When the lamp is in operation, the slits appear as a bright "floating" light source, i.e. a light source that is suspended in the air, something which gives the lamp a unique and aesthetically appealing look. The slits provide a very good "representation" of the SSL element in that the intensity of the light emitted by the SSL element is essentially maintained and there is little or no glare produced. Cost-effective techniques can be used to make the slits, and, by an appropriate choice of the positions, orientations, structures, shapes and/or sizes of the slits, the distribution of the light from the lamp can be adapted to suit application-specific requirements. The light guide helps to effectively transfer heat away from the SSL element.

The slits can be arranged in various ways to suit the intended application, the goal being to create a bright light source. For example, the slits may cross each other in a central region of the light guide. The slits may be arranged mirror-symmetrically with respect to a central plane of the light guide. A cross-section of the slits, perpendicular to a central plane of the light guide, may have an X shape. The slits can be provided by a laser, i.e. the slits can be laser made. From a manufacturing perspective, this is a simple way of making the slits. Also, such slits can have a wide variety of complicated and precise shapes.

The slits may have a thickness in the range 0.1 mm to 5 mm, for example from 0.5 mm to 1 mm. The most suitable thickness of the slits depends on the thickness of the light guide, the orientation of the slits and other factors. As an example, a slit thickness of less than 5 mm is suitable when the light guide is 10 mm thick and the slits are arranged so as to form an X and so that each slit makes an angle of 45° relative to the outer surfaces of the light guide.

The light guide may be flat. The two outer surfaces may be planar and/or parallel. A flat light guide can have outer surfaces with a large area relative to its volume, something which helps to improve the efficiency with which heat is dissipated to the surrounding air.

The lamp may comprise a strip extending along at least a portion of the circumferential edge, the strip being in thermal contact with the light guide and the SSL element. The strip acts as a heat sink and helps to improve the thermal properties of the lamp. Metal strips, such as aluminium strips, are particularly suitable for the present invention because of their thermal properties. The strip may be adapted to allow light to leave the light guide through the circumferential edge, so that the distribution of light from the lamp becomes more spatially uniform. For example, the strip may be provided with perforations and/or be narrower than the width of the circumferential edge. Alternatively, or in addition, the strip can be made of a translucent material or a transparent material, for example transparent polycrystalline alumina (PCA).

The strip may be wider than the width of the circumferential edge. Such a strip is especially suitable for improving the thermal properties of the lamp.

The lamp may comprise a base for mechanically and electrically connecting the lamp. The base may for example be connectable to an Edison screw socket, something which makes the SSL lamp especially suitable for retrofitting applications. The SSL element may be arranged inside the base. For example, the base may comprise side walls, and the SSL element may be arranged between the side walls. By arranging the SSL element inside the base, the base may help to guide light from the SSL element towards the light guide and/or to prevent an observer, when looking at the lamp from some points of view, from looking directly at the SSL element.

According to a second aspect, there is provided a luminaire comprising at least one lamp as described above. The second aspect may provide for technical effects which are identical or similar to those of the first aspect.

It is noted that the invention relates to all possible combinations of features recited in the claims.

BRIEF DESCRIPTION OF THE DRAWINGS

This and other aspects of the present invention will now be described in more detail, with reference to the appended drawings.

As illustrated in the figures, the sizes of layers and regions may be exaggerated for illustrative purposes and, thus, may be provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
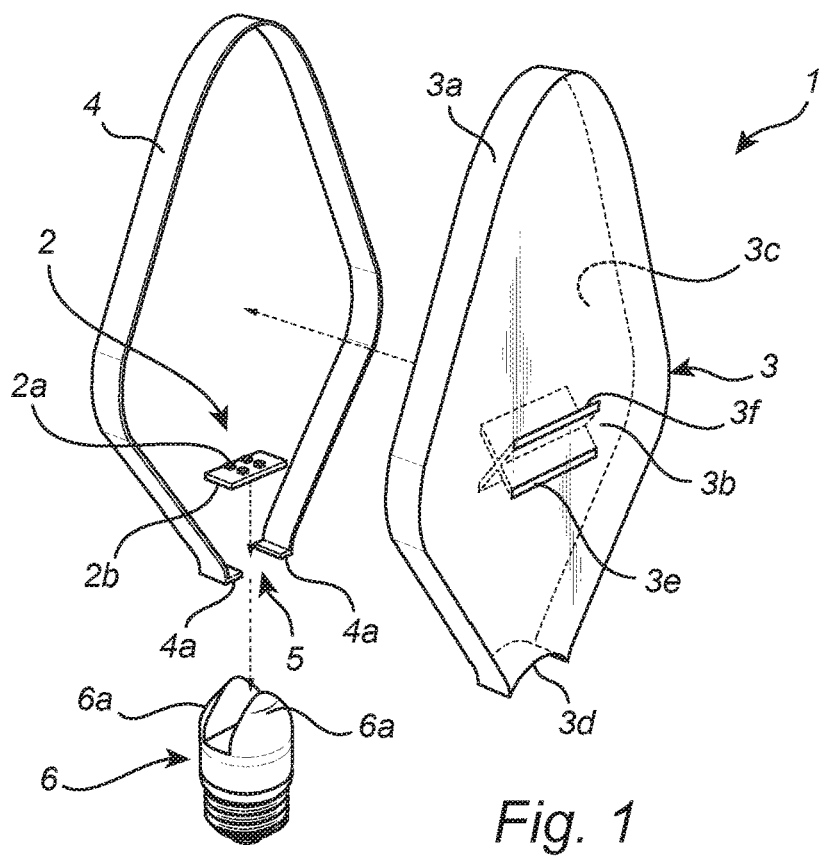
FIG. 1 is an exploded view of a lighting device according to an embodiment of the invention.
Figure 2:
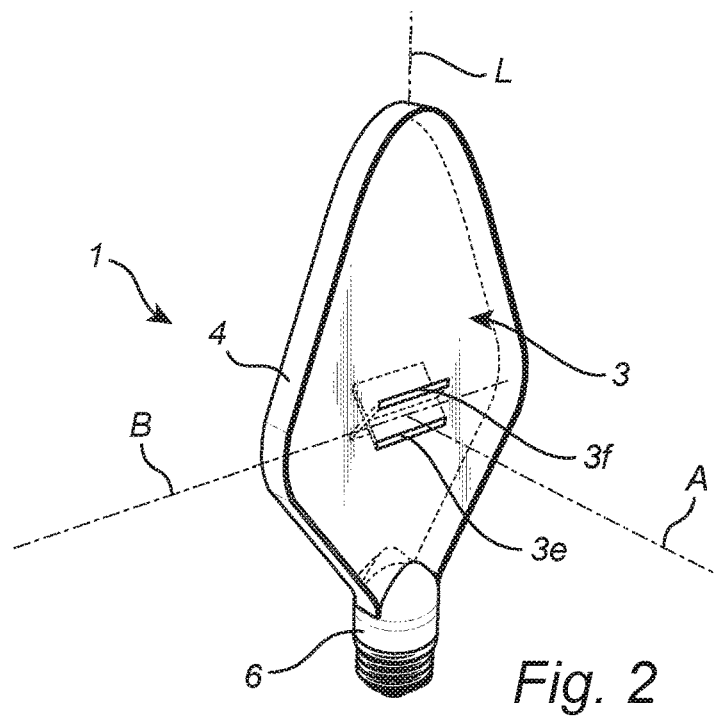
FIG. 2 is a perspective view of the lighting device in FIG. 1.
Figure 3:
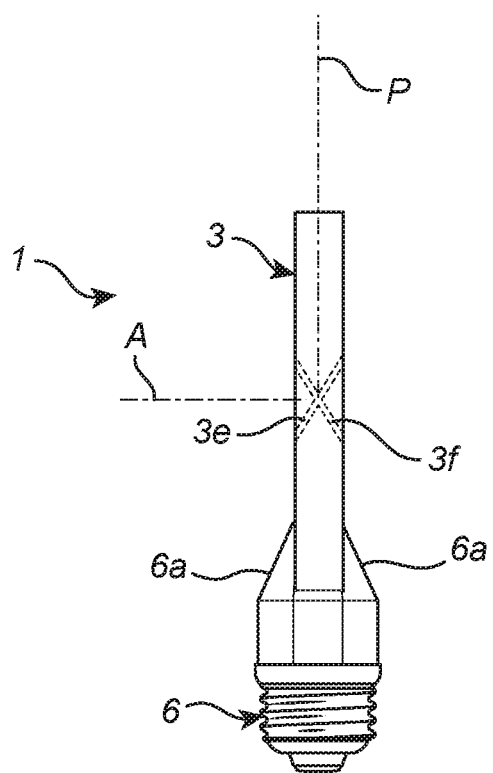
FIG. 3 is a side view of the lighting device in FIG. 1.

FIGS. 1 to 3 show a lamp 1, for example a retrofit lamp. The lamp 3 has a lengthwise axis L, a first transverse axis A and a second transverse axis B. The lengthwise axis L, the first transverse axis A and the second transverse axis B are perpendicular to each other. The lengthwise axis L is parallel to the vertical direction in FIGS. 1 to 3.

The lamp 1 further has a light source in the form of an SSL element 2. In this example the SSL element 2 comprises several LEDs 2a mounted on a circuit board 2b. The circuit board 2b is a printed circuit board, but other types of circuit boards, such as wired circuit boards, are conceivable. The LEDs 2a may for example be semiconductor LEDs, organic LEDs or polymer LEDs. All of the LEDs 2a may be configured to emit light of the same color, for example white light, or different LEDs may be configured to emit light of different colors. It should be noted that in other examples the SSL element 2 may have only one LED 2a.

A light guide 3 is arranged to couple in light emitted by the SSL element 2. The light guide 3 is flat. The light guide 3 has a central plane P which is perpendicular to the first transverse axis A. Differently stated, the central plane P is parallel to the plane spanned by the lengthwise axis L and the second transverse axis B. The light guide 3 has a candle shape. The width of the light guide 3, as measured along the second transverse axis B, varies along the lengthwise axis L. Specifically, the light guide 3 has a narrow top end, a wide waist and a narrow bottom end, the top and bottom ends of the light guide 3 being separated along the lengthwise axis L. The light guide 3 may have a different shape than the one illustrated in FIGS. 1 to 3, such as a circular shape. The light guide 3 has an outer circumferential edge 3a that connects a first outer surface 3b with a second outer surface 3c which are planar and arranged opposite to each other. The first and second outer surfaces 3b, 3c are planar. The first and second outer surfaces 3b, 3c are parallel with each other and with the central plane P. The SSL element 2 is positioned in a depression 3d of the circumferential edge 3a. The depression 3d is arranged by the bottom end of the light guide 3. The light guide 3 is thermally conductive and adapted to operate as a heat sink for the SSL element 2. Examples of suitable materials for the light guide 3 include glass and transparent or translucent plastics, such as polymethyl methacrylate (PMMA) and polycarbonate (PC). The width of the circumferential edge 3a, i.e. the thickness of the light guide 3 as measured along the first transverse axis A, may for example be in the range 6 mm to 15 mm. The light guide 3 is solid.

The light guide 3 is provided with a first slit 3e and a second slit 3f. The slits 3e, 3f are straight, but may have a different shape in another example, such as a curved shape, a zigzag shape or a wavy shape. The slits 3e, 3f are approximately 10 mm wide, as measured along the second transverse axis B, and approximately 1 mm thick as measured along the lengthwise axis L. In another example, the slits 3e, 3f may be thinner or thicker than 1 mm and/or longer or shorter than 10 mm. Also, it should be noted that, in another example, one of the slits 3e, 3f may be wider and/or thicker than the other.

Each of the slits 3e, 3f extends from the first outer surface 3b to the second outer surface 3c. The slits 3e, 3f thus form a respective hole, or opening, through the light guide 3. The slits 3e, 3f cross each other, i.e. overlap, inside the light guide 3. Relative to the lengthwise axis L, the slits 3e, 3f are arranged approximately in level with the widest portion of the light guide 3, the width being measured along the second transverse axis B. Relative to the second transverse axis B, the slits 3e, 3f are arranged in a central region of the first and second outer surfaces 3a, 3b. The slits 3e, 3f can of course be arranged differently than in the illustrated example. For example, relative to the lengthwise axis L, the slits 3e, 3f may be arranged closer to the SSL element 2 than the widest portion of the light guide 3 or farther way from the SSL element 2 than the widest portion of the light guide 3.

The slits 3e, 3f are arranged mirror symmetrically with respect to the central plane P, and a cross section of the slits 3e, 3f, which is perpendicular to the central plane P, has the shape of an X. Stated differently, the slits 3a, 3b are perpendicular to each other and inclined by 45° relative to the first and second outer surfaces 3a, 3b. In a different example, it may be that the slits 3e, 3f are not arranged mirror symmetrically with respect to the central plane P. For example, the slits 3e, 3f may be displaced relative to each other along the lengthwise axis L and/or inclined with respect to each other by an angle which is smaller or greater than 90°. The elongated rectangular openings formed by the slits 3e, 3f in the first and second outer surfaces 3b, 3c are perpendicular to the lengthwise axis L, although this may or may not be the case in a different example. These openings may, for instance, be rotated relative to the central axis A so as to be parallel with the lengthwise axis L or inclined, for example by 45°, relative to the lengthwise axis L.

The lamp 1 further comprises a strip 4 arranged on a portion of the circumferential edge 3a. The length of the strip 4 depends on the size and shape of the light guide 3. The length is typically approximately 20 cm. The width of the strip 4, as measured along the first transverse axis A, is equal to the width of the circumferential edge 3a. However, in a different example, the width of the strip 4 may be smaller or greater than the width of the circumferential edge 3a. The strip 4 follows the contour of the light guide 3 without forming a closed loop. Thus, the strip 4 may be referred to as open. However, it should be noted that, in a different example, the strip 4 may form a closed loop, i.e. strip 4 may be closed. Two ends 4a of the strip 4 are arranged on either side of the depression 3d so that an opening 5, or gap, is formed in level with the depression 3d and the SSL element 2. The SSL element 2 extends over the opening 5 from one of the two ends 4a to the other. The strip 4 is in thermal contact with the SSL element 2 and is adapted to operate as a heat sink for the SSL element 2. The strip 4 is thus capable of transferring heat away from the SSL element 2 to the ambient air, and also to the light guide 3 which also is in thermal contact with the strip 4.

The strip 4 can for example be made of a metal. In such case, the lamp 1 may comprise two electrically isolating plates (not shown), one plate being sandwiched between the SSL element 2 and the two ends 4a of the strip 4 and the other plate being sandwiched between the base 6 (further discussed below) and the two ends 4a of the strip 4.

The lamp 1 further comprises a base 6 for mechanically and electrically connecting the lamp 1. The base 6 is arranged by the bottom end of the light guide 3, i.e. the end of the light guide 3 where the depression 3d is located. The base 6 has a first portion which is proximal to the bottom end of the light guide 3 and which has two side walls 6a projecting in the direction of the lengthwise axis L towards the top end of the lamp 1. The SSL element 2 is arranged between the side walls 6a. The base 6 further has a second portion which is distal to the light guide 3 and which is threaded for screwing into a lamp holder, such as an E14 or E27 lamp holder. A driver (not shown) for powering the SSL element 2 is arranged inside the base 6. By arranging the driver inside the base 6, it is possible to make the lamp 1 particularly compact.

It should be noted that the base 6 may, in addition to or as an alternative to the threaded second portion, be provided with some other type of electrical and/or mechanical interface, such as a bayonet mount or a USB connection. It should also be noted that it is not necessary that there is a driver arranged inside the base 6. For example, instead of a driver, a current source, such as a resistor, and a connector, such as a USB connector, may be arranged inside the base 6. This would make the lamp 1 relatively inexpensive to manufacture as well as particularly suitable for luminaires, such as chandeliers, which have multiple lamps and a central unit for controlling the lamps.

The lamp 1 is put in operation by connecting the base 6 to an electrical power supply, such as the mains power grid, whereby power is supplied to the SSL element 2 via the base 6. The SSL element 2 emits light that is coupled into the light guide 3. The in-coupled light travels through the light guide 3 by total internal reflection until it is coupled out through one of the two slits 3e, 3f or one of the two outer surfaces 3b, 3c, or the portions of the circumferential edge 3a that are not covered by the strip 4. The light that leaves the light guide 3 illuminates the surroundings of the lamp 1. The strip 4 transfers heat generated by the SSL element 2 to the ambient air. Some of the heat absorbed by the strip 4 is transferred to the light guide 3 and then to the ambient air through, primarily, the two outer surfaces 3b, 3c. Some of the heat generated by the SSL element 2 is absorbed directly by the light guide 3 and then dissipated to the ambient air. The mechanisms by which heat is dissipated from the light guide 3 and the strip 4 are convection and thermal radiation.

The person skilled in the art realizes that the present invention by no means is limited to the embodiments described above. On the contrary, many modifications and variations are possible within the scope of the appended claims. For example, the strip 4 may be provided with a reflective coating, for example white paint, on the side that faces the light guide 3. The reflective coating helps to reduce losses that may occur when light travelling inside the light guide 3 strikes the strip 4.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A lamp comprising:
    a solid-state lighting element;
    a light guide having two oppositely arranged outer surfaces and a circumferential edge joining the respective circumferences of the two outer surfaces, the light guide being arranged to couple in light emitted by the solid-state lighting element at the circumferential edge; and
    two slits arranged in the light guide and adapted to couple light out from the light guide,
    wherein each of the two slits extends from one of the outer surfaces to the other one of the outer surfaces, the two slits at least partly crossing each other inside the light guide.

2. The lamp according to claim 1, wherein the slits cross each other in a central region of the light guide.

3. The lamp according to claim 1, wherein the slits are arranged mirror-symmetrically with respect to a central plane of the light guide.

4. The lamp according to claim 1, wherein a cross-section of the slits has an X shape, the cross section being perpendicular to a central plane of the light guide.

5. The lamp according to claim 1, wherein the slits are provided by a laser.

6. The lamp according to claim 1, wherein each one of the slits has a thickness in the range from 0.1 mm to 5 mm, for example from 0.5 mm to 1 mm.

7. The lamp according to claim 1, wherein the light guide is flat.

8. The lamp according to claim 1, wherein the two outer surfaces are planar.

9. The lamp according to claim 1, wherein the two outer surfaces are parallel.

10. The lamp according to claim 1, further comprising a strip extending along at least a portion of the circumferential edge, the strip being in thermal contact with the light guide and the solid-state lighting element.

11. The lamp according to claim 10, wherein a width of the strip is smaller than a width of the circumferential edge.

12. The lamp according to claim 10, wherein the strip is perforated.

13. The lamp according to claim 10, wherein the strip is transparent or translucent.

14. The lamp according to claim 10, further comprising a base for mechanically and electrically connecting the lamp, the solid-state lighting element being arranged inside the base.

15. A luminaire comprising at least one lamp according to claim 10.

* * * * *